United States Patent [19]
Szabo

[11] Patent Number: 5,472,016
[45] Date of Patent: Dec. 5, 1995

[54] QUICK CONNECTOR STUFFER PIN

[75] Inventor: George Szabo, Ortonville, Mich.

[73] Assignee: ITT Corporation, New York, N.Y.

[21] Appl. No.: 131,294

[22] Filed: Oct. 4, 1993

[51] Int. Cl.⁶ .................................................. F16L 55/10
[52] U.S. Cl. .............................. 138/89; 138/109; 285/319
[58] Field of Search ........................... 138/89, 89.2, 89.4, 138/96 R, 96 T, 109, 113; 285/319, 317, 320, 340, 921

[56] References Cited

U.S. PATENT DOCUMENTS

| 1,232,272 | 7/1917 | Frazier et al. | 138/89.4 |
|---|---|---|---|
| 4,128,264 | 12/1978 | Oldford . | |
| 4,601,497 | 7/1986 | Bartholomew | 285/319 |
| 4,681,351 | 7/1987 | Bartholomew | 285/319 |
| 4,753,458 | 6/1988 | Case et al. | 285/319 |
| 4,846,506 | 7/1989 | Bocson et al. | 285/319 |
| 4,915,136 | 4/1990 | Bartholomew . | |
| 4,945,951 | 8/1990 | Beamer | 138/96 T |
| 5,033,513 | 7/1991 | Bartholomew | 138/109 |
| 5,168,902 | 12/1992 | Hood | 138/89 |
| 5,195,787 | 3/1993 | Bartholomew . | |

FOREIGN PATENT DOCUMENTS 9113789 2/1992 Germany .
1193759 6/1970 United Kingdom .

Primary Examiner—David A. Scherbel
Assistant Examiner—James F. Hook
Attorney, Agent, or Firm—Robert P. Seitter; J. Gordon Lewis

[57] ABSTRACT

A stuffer pin for mounting seals and a retainer element in a quick connector used with fluid conduits. The stuffer pin includes an integral shaft, an enlarged stop and a handle. Annular seal mounting portions are formed on the shaft for releasibly supporting seal elements. A ridge is formed on the shaft for releasibly engaging and mounting a retainer on the shaft. Resilient arms extend axially from an end of the shaft and have a larger nominal outer diameter than the diameter of the shaft to retain the seal elements on the shaft prior to insertion into a bore in a fluid carrying member. The resilient arms are bent radially inward when contacting a stepped bore in the fluid carrying member to enable release of the seals and retainer elements during withdrawal of the stuffer pin from the bore.

37 Claims, 2 Drawing Sheets

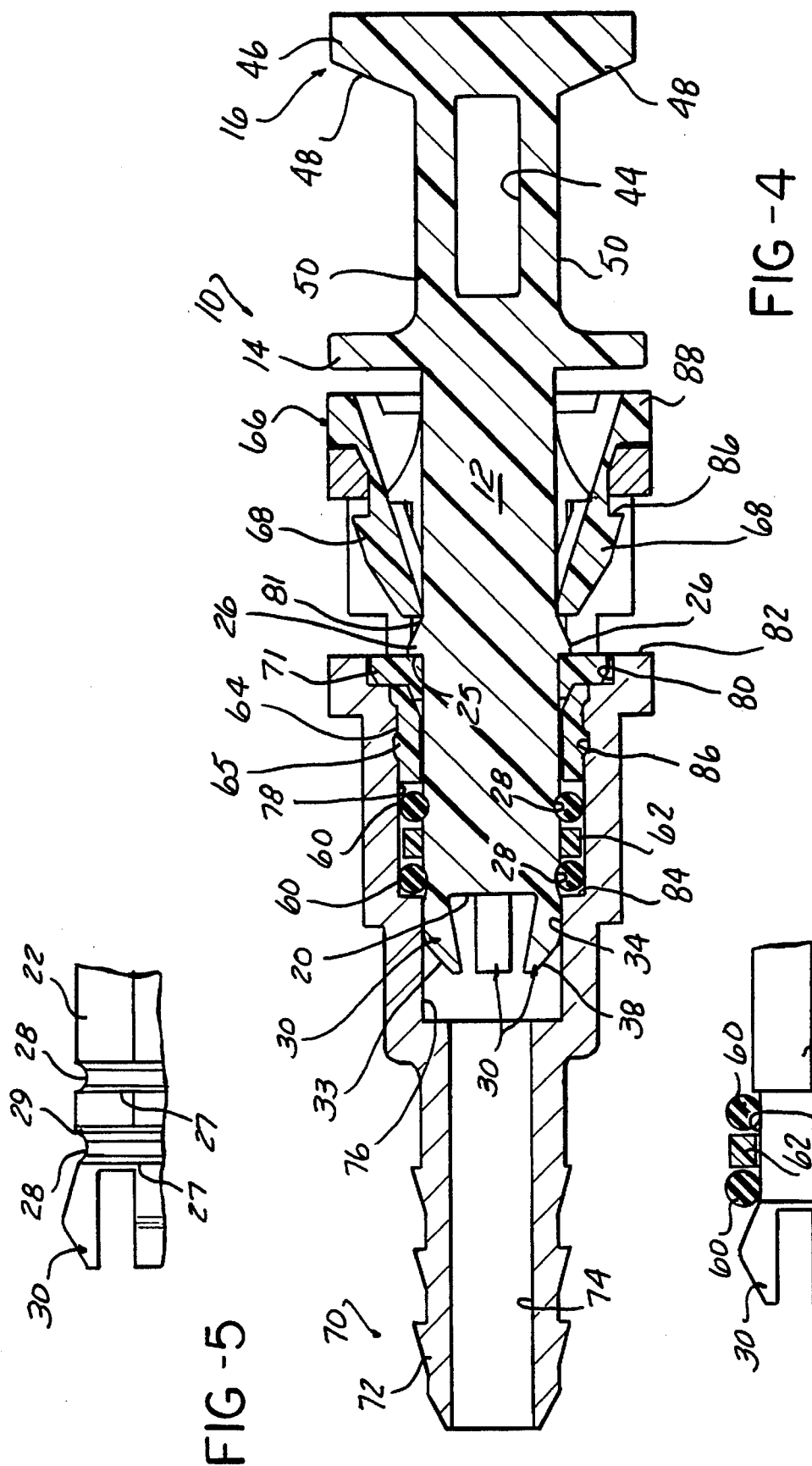

QUICK CONNECTOR STUFFER PIN

BACKGROUND OF THE INVENTION

The present invention relates, in general, to quick connectors.

Snap-fit or quick connectors are employed in a wide range of applications, particularly, for joining fluid carrying conduits in automotive and industrial applications. In a typical quick connector, a retainer is fixedly mounted within a bore in a housing or conduit. The retainer has a plurality of radially extending arms which extend inwardly toward the axial center line of the bore. A tube to be sealingly mounted in the bore includes a radially upset portion which abuts an inner peripheral surface of the retainer arms. Seal and spacer members as well as a bearing or top hat are typically mounted in the bore ahead of the retainer to form a seal between the female housing or conduit and the tube when the tube is lockingly engaged with the retainer arms.

In such a connector, it is necessary to first mount the sealing members, the top hat, and the retainer in the bore in the housing or conduit. A stuffer plug disclosed in U.S. Pat. No. 4,915,136 has been devised for this purpose. This stuffer pin includes an elongated, tubular rod which coaxially supports sealing elements and a retainer element prior to insertion of such elements into the bore in a housing. Positioning means in the form of annular grooves are formed in the end of the rod for supporting O-ring type seal members. An annular projection formed with an inclined surface is also formed on the rod and engages the retainer element to releasibly mount the retainer on the stuffer plug body before the rod is inserted into the bore of the housing. Once the rod is fully inserted into the bore in the housing, the retainer element engages the housing and is locked in place. This permits the rod to be withdrawn, during which the seal elements slide from the rod and are positioned in the bore in the housing.

While the stuffer plug disclosed in this patent provides a suitable means for mounting sealing elements and a retainer in the bore in a housing of a quick-type connector, due to manufacturing tolerances, the O-ring seals can vary in diameter such that such seals can frequently be oversized so as not to remain in the annular positioning grooves in the rod prior to insertion of the rod into the bore in the housing. Such seals can then fall off of the stuffer plug thereby hindering assembly of the quick connector or resulting in an incomplete quick connector.

It would be desirable to provide a stuffer pin for a quick connector which ensures that the sealing members and the retainer element remain in position on the stuffer pin prior to the insertion of the stuffer pin into a bore in a housing. It would also be desirable to provide a stuffer pin having these features which also enables that the sealing member and the retainer element can be easily removed from the stuffer pin with low force requirements during withdrawal of the stuffer pin from the bore in the housing. It would be desirable to provide a stuffer pin having these features which also provides self-centering of the seal members and the retainer element in the bore in the housing. Finally, it would be desirable to provide a stuffer pin having these features which also includes a suitably formed handle for easy manual finger gripping or for automated insertion and withdrawal of the stuffer pin into and out of the bore in a housing.

SUMMARY OF THE INVENTION

The present invention is a stuffer pin for mounting seal elements and a retainer element in the bore of a housing which forms a part of a quick connector.

The stuffer pin includes a shaft having first and second ends. An enlarged stop is formed at the first end of the shaft and extends radially outward from the shaft. Handle means are mounted on the stop, opposite from the first end of the shaft for facilitating movement of the shaft into and out of a fluid carrying member. Seal mounting means are formed on the shaft for releasibly supporting one or more seal elements on the shaft. Means are formed on the shaft between the stop and the seal mounting means for releasibly mounting a retainer on the shaft. At least one resilient arm is formed on the second end of the shaft and extends axially from the second end of the shaft. The resilient arm has an outer edge which nominally has a greater diameter than the inner diameter of a stepped bore and the inner diameter of the seal elements for releasibly holding the seal elements on the shaft. The resilient arm bends radially inward under contact with the stepped bore in a fluid carrying member during insertion of the stuffer pin into the bore to enable release of the seal means and the retainer from the shaft as the shaft is withdrawn from the bore so as to mount the seal elements and the retainer in the bore in the fluid carrying member.

In a preferred embodiment, at least two diametrically opposed arms and, preferably, four equi-circumferentially spaced arms are formed on and extend axially from the second end of the shaft. Each arm preferably comprises a first side wall extending axially from the second end of the shaft and terminating in an end wall. A second side wall is spaced from the first side wall and extends from the second end of the shaft. The second side wall includes a first inclined surface extending from the second end of the shaft to the outer edge of the arm and a second inclined surface extending from the outer edge to the end wall of the arm.

The seal mounting means preferably comprises an annular constant diameter portion formed on the shaft for releasibly receiving an O-ring seal thereon. Preferably, a pair of annular, constant diameter portions are spaced apart from each other and from the second end of the shaft, each annular portion releasibly supporting an O-ring seal thereon. Preferably, the pair of annular portions are spaced apart a predetermined distance to enable a spacer to be mounted on the shaft between the seal elements. Optionally, a groove may be formed in each annular portion for supporting a seal element therein.

The retainer mounting means preferably comprises at least one radially extending ridge formed on the shaft spaced from the stop. The ridge releasibly engages one arm on the retainer element to releasibly mount the retainer element on the shaft. Preferably, a pair of diametrically opposed ridges are formed on the shaft.

In a preferred embodiment, the handle means is in the form of an elongated, planar member extending axially from the stop and terminating in an enlarged end flange at an outer end. An aperture may be formed in the planar member to facilitate manual finger gripping for easy insertion and removal of the stuffer pin into and out of a bore in a fluid carrying member. The handle and/or aperture also facilitates easy insertion and removal of the stuffer pin into and out of the bore by automated tooling.

The stuffer pin of the present invention provides improved performance over previously devised stuffer pins or stuffer plugs in that the resilient arm or arms ensure that the seal elements are fixedly retained on the stuffer pin prior to insertion of the stuffer pin into the bore in a fluid carrying member. The resiliency of the arms permits their easy inward bending to enable the seal members to be released from the stuffer pin during withdrawal of the stuffer pin from the bore under low force loads. The unique handle facilitates easy manual finger gripping as well as attachment to automated tools for insertion and withdrawal of the stuffer pin into and out of the bore in the fluid carrying member.

BRIEF DESCRIPTION OF THE DRAWING

The various features, advantages and other uses of the present invention will become more apparent by referring to the following detailed description and drawing in which:

FIG. 4 is an enlarged longitudinal cross sectional view showing the insertion position of the stuffer pin shown in FIG. 3 in a fluid type connector;

FIG. 5 is an enlarged, fragmentary side elevational view of an alternate embodiment of the seal mounting means; and FIG. 6 is an enlarged, partial cross sectional view of another embodiment of the seal mounting means.

DESCRIPTION OF THE PREFERRED EMBODIMENTS

Figure 1:
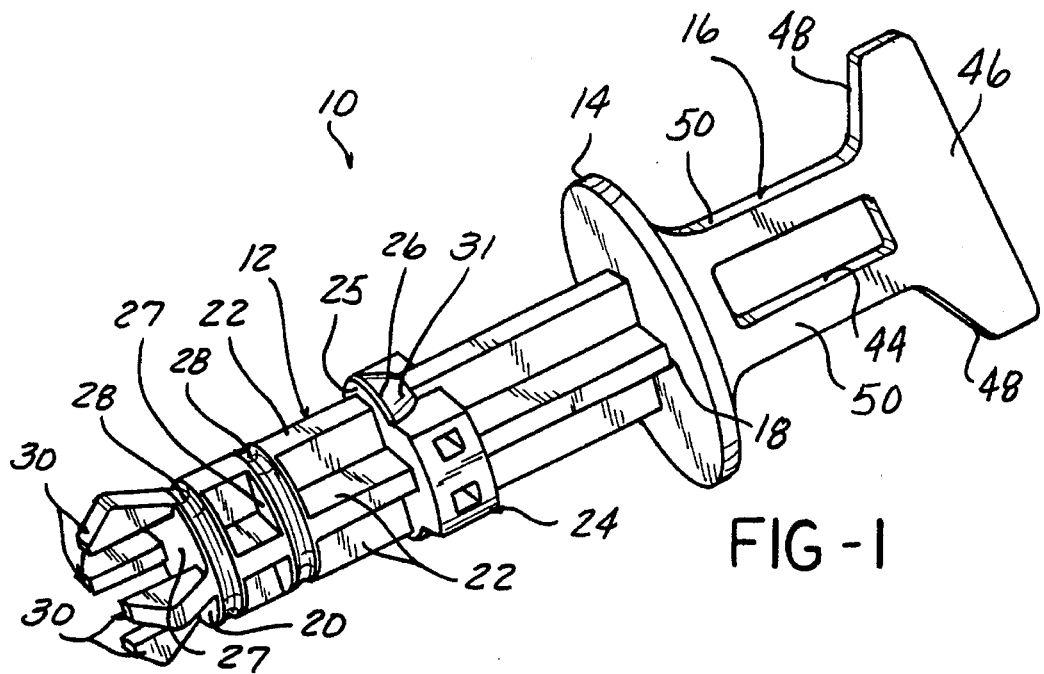
FIG. 1 is a perspective view of a stuffer pin constructed in accordance with a preferred embodiment of the present invention.

Referring to FIGS. 1–4 of the drawing, there is depicted a stuffer pin 10 designed to mount seal elements and a retainer in a bore in a fluid carrying member.

Figure 2:
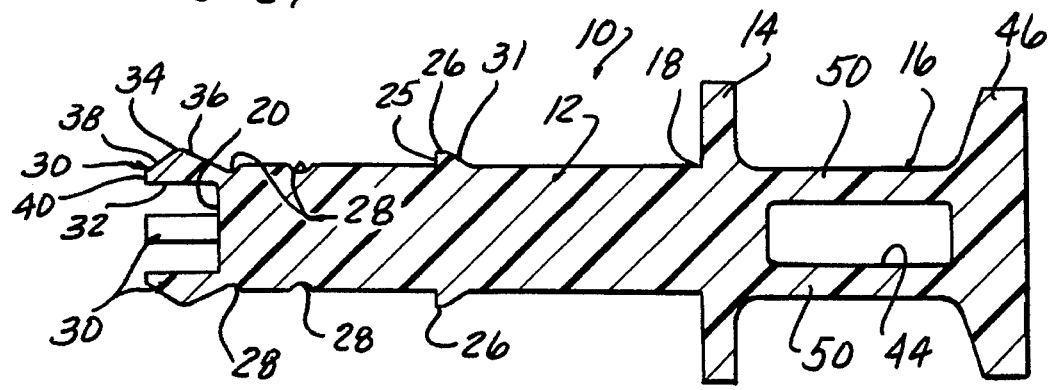
FIG. 2 is a longitudinal cross sectional view of the stuffer pin shown in FIG. 1.
Figure 3:
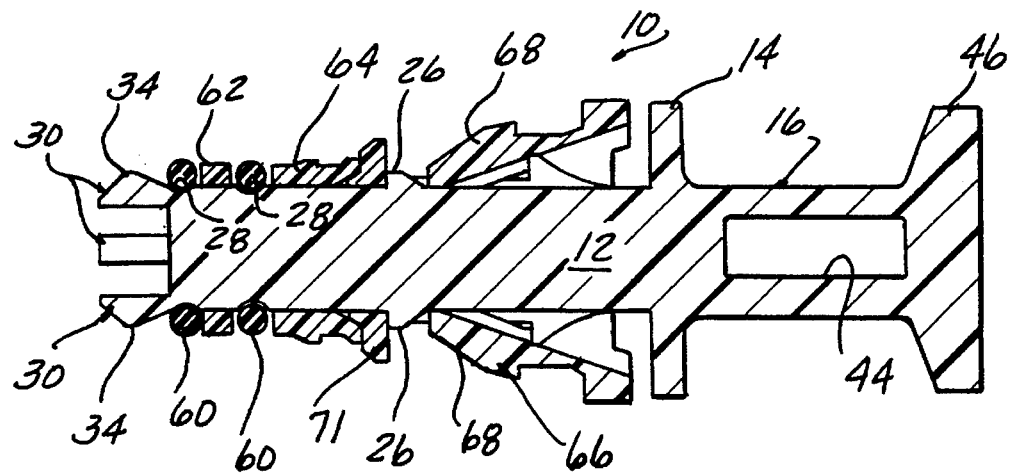
FIG. 3 is a longitudinal cross sectional view, similar to FIG. 2, but showing the mounting of the seal elements, spacer, top hat and retainer element on the stuffer pin.

As shown in FIGS. 1–3, the stuffer pin 10 is in the form of a one-piece body, preferably formed of a suitable plastic material. The stuffer pin includes a shaft 12, a stop 14, and a handle means 16.

The shaft 12 has a tubular, elongated shape with a first end 18 and an opposed second end 20. By way of example only, the shaft 12 is formed of four perpendicular oriented legs, each denoted by reference number 22, which are spaced 90° apart and integrally joined at a common center edge. The first end 18 of the shaft 12 is integrally formed with the stop 14, with the second end 20 extending axially from the first end 18 and the stop 14. It will be understood that the shaft 12 may have other shapes, such as a generally solid, cylindrical shape with a smooth outer surface.

A retainer mounting means denoted by reference number 24 is formed at a predetermined position on the shaft 12 between the first and second ends 18 and 20 thereof. The retainer mounting means 24 is generally in the form of an annular collar having at least one and preferably two upstanding ridges 26 which are diametrically opposed on the shaft 12. The ridges 26 includes a front face 25 extending generally perpendicular from the leg 22 and an inclined surface 31 extending smoothly from an outer edge of the face 25 to the leg 22 to releasably engage a retainer, as described hereafter.

Seal mounting means 27 are also formed on the shaft 12. At least one and preferably two seal mounting means 27 are mounted on the shaft 12 adjacent the second end 20 thereof. In one embodiment shown in FIGS. 1–4, the seal mounting means 27 is in the form of an annular constant diameter portion formed on the legs 22 forming the shaft 12. An annular groove 28 may optionally be formed on each annular portion 27. The pair of seal mounting portions 27 are spaced apart a predetermined distance so as to enable a spacer element, described hereafter, to be releasibly mounted on the shaft 12 between the seal means or elements mounted in the seal mounting means 27.

A modification to the seal mounting means 27 is depicted in FIG. 5. A curvilinear surface 29 is formed on the end of the outermost annular portion 27 facing the other annular portion 27. The surface 29 has a smoothly curved edge or, alternately, a tapered edge extending between the radially outermost edge of the annular portion 27 adjacent to the groove 28 and the transverse face of the annular portion 27. The surface 29 provides a smooth surface for the sliding of the seal element from the other annular portion 27 during withdrawal of the stuffer pin 10 from the bore, as described hereafter without cutting or otherwise damaging the seal element.

Yet another embodiment of the seal mounting means is shown in FIG. 6. In this embodiment, the annular portion extends longitudinally a distance sufficient to receive two spaced seals and an intermediately located spacer, all described in greater detail hereafter. The annular portion 31 has a constant outer diameter and a solid form extending outward to the radially outermost edges of the legs 22. A shallow annular recess 33 is formed in the annular portion 31 to support the two seals and the spacer therein.

At least one and preferably a plurality of resilient arms 30 are integrally formed on and extend axially outward from the second end 20 of the shaft 12. Although the shaft 12 may be provided with a minimum of one resilient arm 30, at least two diametrically opposed arms 30, and, preferably, four equi-circumferentially spaced arms 30 are formed on and extend axially from the second end 20 of the shaft 12. The arms 30 are formed with a narrow cross section so as to be able to resiliently bend or inwardly flex upon insertion of the stuffer pin 10 into a bore in a fluid carrying member, as described hereafter.

By way of example only, each arm 30, as shown in FIG. 2, includes a first inner planar side wall 32 which is parallel to the longitudinal axis of the stuffer pin 10 and extends axially from the second end 20 of the shaft 12. Each arm 30 also has a maximum diameter outer edge 34 which is spaced from the inner side wall 32. The outer edge 34 is formed on a second side wall which is formed of a first inclined surface 36 extending radially outward from the second end 20 of the shaft 12 to the outer edge 34. A second inclined surface 38 extends radially downward from the outer edge 34 to an outer end wall 40 of the arm 30. The nominal diameter of the outer edge 34 is greater than the diameter of the shaft 12 and the inside diameter of a seal element releasibly mounted on the shaft 12 so as to retain the seal element on the shaft 12 as described in greater detail hereafter.

The stop 14 is integrally formed with the shaft 12 and generally has a circular, disk-like shape. The stop 14 has an outer edge with a substantially larger diameter than the nominal diameter of the shaft 12. The diameter of the stop 14 is selected to be greater than the diameter of a bore in a fluid carrying member or conduit into which the stuffer pin 10 is inserted to limit the maximum insertion distance of the stuffer pin 20 into the bore. Further, the stop 14 coacts with the projections 26 to form a mounting position for the retainer on the shaft 12.

The stuffer pin 10 of the present invention uniquely includes a handle means 16 to facilitate manual insertion and withdrawal of the stuffer pin 10 into and out of a bore in a fluid carrying member or engagement with an automatic insertion and withdrawal tool. By way of example only, the handle means 16 is in the form of an elongated planar member extending axially from one surface of the stop 14 opposite from the shaft 12. An aperture 44 is formed in the planar member to facilitate manual finger gripping of the handle means 16 by a user. An enlarged end flange 46 is formed on the outer axial end of the planar member. The enlarged end 46 is formed with smoothly tapering edges 48 which join elongated ribs 50 formed on opposite sides of the aperture 44.

As shown in FIGS. 3 and 4, the stuffer pin 10 releasibly supports at least one and preferably a pair of seal elements 60, such as O-rings. The seal elements or O-rings 60 are releasibly supported in the seal mounting grooves 28 formed on the shaft 12 and are spaced apart as shown in FIG. 3 by a predetermined distance. A spacer 62 formed of a suitable plastic material, such as nylon, is releasibly mounted on the shaft 12 between the seal elements 60. A top hat 64 which forms a bearing surface for a conduit inserted into a fluid carrying member, as described hereafter, is also releasibly mounted on the shaft 12 adjacent the innermost spaced seal element 60. A retainer element 66, typically employed in quick-type connectors and formed of a suitable plastic material, such as nylon, is releasibly mounted on the shaft 12. As is conventional, such a retainer element 66 includes a pair of diametrically opposed, resilient arms 68 which are spaced from an enlarged end wall 71. The retainer mounting projections 26 formed on the shaft 12 releasibly engage the retainer 66 between the end wall 71 and the ends of the resilient arms 68 to releasibly mount the retainer 66 on the shaft 12 between the top hat 64 and the seat.

In using the stuffer pin 10 of the present invention, the retainer element 66 will first be urged over the second end 20 of the shaft 12 until the projections 26 on the shaft 12 snap into the space between the end wall 71 and the ends of the resilient arms 68 on the retainer 66. The top hat 64 is then slid over the resilient arms 30 and the shaft 12 into contact with the end wall 71 of the retainer 66. The first O-ring 60 is then mounted on the shaft 12 in engagement with the innermost seal mounting means 27. The spacer 62 is then inserted over the resilient arms 30 on the shaft 12 into proximity with the first seal 60. The second O-ring 60 is then urged onto the shaft 12 on the outermost seal mounting portion 27.

As shown in FIG. 3, the larger nominal diameter of the outer edge 34 of the resilient arms 30 is greater than the inside diameter of the endmost O-ring 60. This retains the O-ring 60 as well as the spacer 62, the other O-ring 60, and the top hat 64 on the shaft 12 of the stuffer pin 10 after assembly onto the shaft 12 and prior to insertion of the stuffer pin 10 into a bore in a fluid carrying member.

Referring now to FIG. 4, there is depicted the insertion position of the stuffer pin 10 in a stepped bore of a fluid carrying member 70. The fluid carrying member 70 is illustrated as being a female connector part of a quick-type connector. The female connector part 70 includes an elongated body with a conduit receiving adapter 72 formed at one end. An elongated bore 74 extends through the conduit receiving adapter 72 and opens to a stepped bore within the body formed of a first diameter bore 76 having a larger diameter than the bore 74 and a second bore 78 of still larger diameter. An end bore 80 opens to an end wall 82 in the body of the female connector part 70. As is typical in quick connectors, the O-ring seals 60, the spacer 62, the top hat 64 and the retainer 66 are fixedly mounted in the bores 78 and 80 and releasibly and sealingly receive a male conduit, not shown, having an upstanding ridge which releasibly engages the retainer 66 between the ends of the resilient arms 68 and the end wall 71 thereof.

The outer edge 34 of the resilient arms 30 on the stuffer pin 10 of the present invention are sized to have a diameter less than the diameter of the bore 78 in the female connector part 70, but a larger diameter than the bore 76. In this manner, during insertion of the stuffer pin 10 into the female connector part 70, the resilient arms 30 will slide freely through the bores 80 and 78 in the female connector part 70. However, after the stuffer pin 10 has been inserted a sufficient distance into the female connector part 70, the second inclined surface 38 on the resilient arms 30 will contact a shoulder 84 formed between the bores 76 and 78. Further insertion of the stuffer pin 10 causes the resilient arms 30 to bend radially inward as the inclined surface 38 slides across the shoulder 84 into the smaller diameter bore 76 in the female connector part 70 until the stuffer pin 10 reaches the full insertion position shown in FIG. 4. In this full insertion position, the endmost O-ring seal 60 is disposed in proximity or registry with the shoulder 84 in the female connector part 70. At the same time, an upstanding annular ridge 65 in the top hat 64 engages an annular recess 86 formed in the body of the female connector part 70 to lock the top hat 64 in the bore 78 of the female connector part 70. At the same time, a groove on the retainer 66 formed between a shoulder 84 formed on the resilient arms 68 and an enlarged diameter end wall 88 engages an end flange formed on the female connector part 70 to lock the retainer 66 to the female connector part 70.

At this time, the stuffer pin 10 may be withdrawn from the female connector part 70 to the right in the orientation shown in FIG. 4. Since the top hat 64 is locked in the recess 86 of the female connector part 70 and the retainer element 66 is likewise locked in position on the female connector part 70, sliding withdrawal of the stuffer pin 10 pulls the shaft 12 of the stuffer pin 10 out of engagement with the O-ring seals 60, the spacer 62, the top hat 64 and the retainer 66. It should be noted that the smoothly tapered or inclined surface 31 on the ridges 26 on the shaft 12 enables the shaft 12 to easily slide over the ends of the resilient arms 68 on the retainer 66 to permit easy disengagement of the shaft 12 from the retainer element 66 during withdrawal of the stuffer pin 10 from the female connector part 70.

It should also be noted that the handle means 16 facilitates easy insertion and withdrawal of the stuffer pin 10 into and out of the female connector part 70. The aperture 44 and the enlarged end flange 46 with tapered edges 48 provides a secure finger grip to permit secure manual grasping of the stuffer pin 10. At the same time, the handle means 16 in the shape illustrated in FIGS. 1–4 or with a modified shape may also be adapted for use with tooling for automatic insertion and withdrawal of the stuffer pin 10 into and out of the female connector part 70.

In summary, there has been disclosed a unique stuffer pin for mounting sealing and retainer elements in a bore of a female connector part of a quick connector. The stuffer pin is designed to securely retain the seal elements thereon prior to insertion without any slippage of the seal elements from the stuffer pin. The stuffer pin is also formed with a unique handle to facilitate manual insertion and withdrawal as well as usage of the stuffer pin with automatic insertion and withdrawal tooling.

What is claimed is:

1. A stuffer pin for mounting at least one seal element and a retainer including at least one resilient arm in one end of a bore of a fluid carrying member, the stuffer pin comprising:

a shaft having first and second opposed ends;

a stop formed at the first end of the shaft and extending radially outward therefrom;

means, mounted on the stop, opposed from the first end of the shaft, for facilitating movement of the shaft into and out of a bore of a fluid carrying member;

seal mounting means, formed on the shaft, for releasibly supporting at least one seal element on the shaft;

means, formed on the shaft, between the stop and the seal mounting means, for releasibly mounting a retainer on the shaft; and means, formed on the shaft separate from the seal mounting means and having an inner edge spaced radially from an axis of the shaft allowing inwardly bending movement, for fixedly retaining the at least one seal element on the shaft prior to insertion into a bore in a fluid carrying member.

2. The stuffer pin of claim 1 wherein the retaining means comprises:

at least one resilient arm formed on the second end of the shaft and having an outer edge of greater nominal diameter than a diameter of the shaft for releasibly holding the at least one seal element on the shaft but bending radially inward during contact with a bore in a fluid carrying member to enable release of the seal element and the retainer from the shaft during withdrawal of the shaft from the bore.

3. The stuffer pin of claim 2 wherein the at least one resilient arm extends axially from the second end of the shaft.

4. The stuffer pin of claim 2 wherein the at least one resilient arm comprises a pair of circumferentially spaced arms.

5. The stuffer pin of claim 4 wherein the pair of resilient arms are diametrically opposed.

6. The stuffer pin of claim 2 wherein the at least one resilient arm comprises four equi-circumferentially spaced arms.

7. The stuffer pin of claim 2 wherein the at least one resilient arm comprises:

a first side wall extending axially from the second end of the shaft and terminating in an end wall;

a second side wall spaced from the first side wall and extending from the second end of the shaft, the second side wall including a first inclined surface extending from the second end of the shaft to an outer edge, and a second inclined surface extending from the outer edge and the end wall.

8. The stuffer pin of claim 1 wherein the seal mounting means comprises:

an annular portion formed on the shaft for receiving a seal element thereon.

9. The stuffer pin of claim 8 further comprising:

a recessed, annular groove formed on the periphery of the annular portion.

10. The stuffer pin of claim 1 wherein the seal mounting means comprises:

a pair of annular portions formed on and spaced apart along the shaft, each annular portion releasibly receiving a seal element thereon.

11. The stuffer pin of claim 10 wherein the pair of annular portions are spaced apart a predetermined distance to enable a spacer to be supported on the shaft between the annular portions.

12. The stuffer pin of claim 10 further comprising:

each annular portion having a transverse face opposed from a transverse face of the other annular portion; and a curvilinear edge formed on the radial outermost edge of the transverse face of the annular portion adjacent to the second end of the shaft.

13. The stuffer pin of claim 12 wherein the curvilinear edge is arcuate shaped.

14. The stuffer pin of claim 12 wherein the curvilinear edge is an inclined edge.

15. The stuffer pin of claim 1 wherein the retainer mounting means comprises:

a pair of diametrically opposed, radially extending ridges formed on the shaft and spaced from the stop, each ridge releasibly engaging a resilient arm on the retainer to releasibly mount the retainer on the shaft.

16. The stuffer pin of claim 15 further comprising a pair of diametrically opposed ridges formed on the shaft.

17. The stuffer pin of claim 15 wherein the at least one ridge has an inclined surface extending in one direction from a radially outermost edge.

18. The stuffer pin of claim 1 wherein the means for facilitating movement of the shaft comprises:

an elongated member extending axially from the stop; and an aperture formed in the planar member.

19. The stuffer pin of claim 18 further comprising:

an enlarged end flange formed on the elongated member and extending transversely outward from the elongated member to form an enlarged gripping surface.

20. The stuffer pin of claim 1 wherein the shaft, the stop and the handle means are integrally formed as a one-piece, unitary member.

21. A stuffer pin for mounting at least one seal element and a retainer including at least one resilient arm in one end of a bore of a fluid carrying member, the stuffer pin comprising:

a shaft having first and second opposed ends;

a stop formed at the first end of the shaft and extending radially outward therefrom;

handle means, mounted on the stop, opposed from the first end of the shaft, for facilitating movement of the shaft into and out of a bore of a fluid carrying member;

seal mounting means, formed on the shaft, for releasibly supporting at least one seal element on the shaft;

means, formed on the shaft, between the stop and the seal mounting means, for releasibly mounting a retainer on the shaft; and at least one resilient arm formed on the second end of the shaft and having an outer edge of greater nominal diameter than a diameter of the shaft for releasibly holding the at least one seal element on the shaft and having an inner edge spaced radially from an axis of the shaft allowing bending radially inward movement during contact with a bore in a fluid carrying member to enable release of the seal element and the retainer from the shaft during withdrawal of the shaft from the bore.

22. The stuffer pin of claim 21 wherein the at least one resilient arm comprises a pair of circumferentially spaced arms.

23. The stuffer pin of claim 22 wherein each resilient arm comprises:

a first side wall extending axially from the second end of the shaft and terminating in an end wall;

a second side wall spaced from the first side wall and extending from the second end of the shaft, the second side wall including a first inclined surface extending from the second end of the shaft to an outer edge, and a second inclined surface extending from the outer edge and the end wall.

24. The stuffer pin of claim 21 wherein the seal mounting means comprises:

an annular portion formed on the shaft for receiving a seal element thereon.

25. The stuffer pin of claim 24 further comprising:

a recessed, annular groove formed on the periphery of the annular portion.

26. The stuffer pin of claim 21 wherein the seal mounting means comprises:

a pair of annular portions formed on and spaced apart along the shaft, each annular portion releasibly receiving a seal element thereon.

27. The stuffer pin of claim 26 further comprising:

each annular portion having a transverse face opposed from a transverse face of the other annular portion; and a curvilinear edge formed on the radial outermost edge of the transverse face of the annular portion adjacent to the second end of the shaft.

28. The stuffer pin of claim 27 wherein the curvilinear edge is arcuate shaped.

29. The stuffer pin of claim 27 wherein the curvilinear edge is an inclined edge.

30. The stuffer pin of claim 21 wherein the retainer mounting means comprises:

a pair of diametrically opposed, radially extending ridges formed on the shaft and spaced from the stop, each ridge releasibly engaging a resilient arm on the retainer to releasibly mount the retainer on the shaft.

31. The stuffer pin of claim 30 wherein the at least one ridge has an inclined surface extending in one direction from a radially outermost edge.

32. The stuffer pin of claim 21 wherein the handle means comprises:

an elongated member extending axially from the stop; and an aperture formed in the planar member.

33. The stuffer pin of claim 32 wherein the handle means comprises:

an enlarged end flange formed on the elongated member and extending transversely outward from the elongated member to form an enlarged gripping surface.

34. A stuffer pin for mounting two seal elements and a retainer including at least one resilient arm in one end of a bore of a fluid carrying member, the stuffer pin comprising:

a shaft having first and second opposed ends;

a stop formed at the first end of the shaft and extending radially outward therefrom;

a handle, mounted on the stop opposed from the first end of the shaft, the handle including an elongated planar member having an interior aperture and an enlarged end flange;

seal mounting means, formed on and spaced from the second end of the shaft, for releasibly supporting a pair of seal elements thereon;

a pair of diametrically opposed radially outwardly extending ridges formed on the shaft between the seal mounting grooves and the stop, each ridge including an inclined edge and operative to releasibly mount a retainer on the shaft; and a plurality of circumferentially spaced resilient arms formed on and extending axially outward from the second end of the shaft, each resilient arm having an outer edge of greater nominal diameter than a diameter of the shaft to releasibly hold the seal element on the shaft, and having an inner edge spaced radially from an axis of the shaft allowing bending radially inwardly during contact with a bore in a fluid carrying member to enable release of the seal element and the retainer from the shaft during withdrawal of the shaft from the bore.

35. In combination with a fluid connector formed of a tubular conduit having an annular upset portion at one end, a housing formed with a first axial bore for receiving the conduit and a second bore coaxial with the first bore and of smaller diameter than the first bore, seal elements for providing a fluid seal between the conduit and the first axial bore in the housing, a retainer element including at least one movable arm and means for fixedly mounting the retainer element to the housing, the movable arm engaging the upset on the conduit to fixedly mount the conduit in the first axial bore of the housing, the improvement comprising:

a stuffer pin including a shaft having first and second opposed ends;

a stop formed at the first end of the shaft and extending radially outward therefrom;

means, mounted on the stop, opposed from the first end of the shaft, for facilitating movement of the shaft into and out of a bore of a fluid carrying member;

seal mounting means, formed on the shaft, for releasibly supporting at least one seal element on the shaft;

means, formed on the shaft, between the stop and the seal mounting means, for releasibly mounting a retainer on the shaft; and means, formed on the shaft separate from the seal mounting means and having an inner edge spaced radially from an axis of the shaft allowing inwardly bending movement, for fixedly retaining the at least one seal element on the shaft prior to insertion into a bore in a fluid carrying member.

36. The improvement of claim 35 further comprising:

a pair of seal elements spaced apart a predetermined distance along the shaft; and a spacer mounted on the shaft between the seal elements.

37. The improvement of claim 36 further comprising:

the retainer mounting means and the seal mounting means being spaced apart a predetermined distance sufficient to mount a top hat on the shaft therebetween.

* * * * *

UNITED STATES PATENT AND TRADEMARK OFFICE
CERTIFICATE OF CORRECTION

PATENT NO. : 5,472,016
DATED : December 5, 1995
INVENTOR(S) : George Szabo

It is certified that error appears in the above-indentified patent and that said Letters Patent is hereby corrected as shown below:

<u>In the Claims:</u>

Column 7, line 3, before "means", insert --handle--.

Signed and Sealed this

Twenty-eighth Day of May, 1996

Attest:

BRUCE LEHMAN

Attesting Officer     Commissioner of Patents and Trademarks